Feb. 2, 1943.    W. DE BACK    2,309,630
VINER
Filed July 27, 1940    4 Sheets-Sheet 2
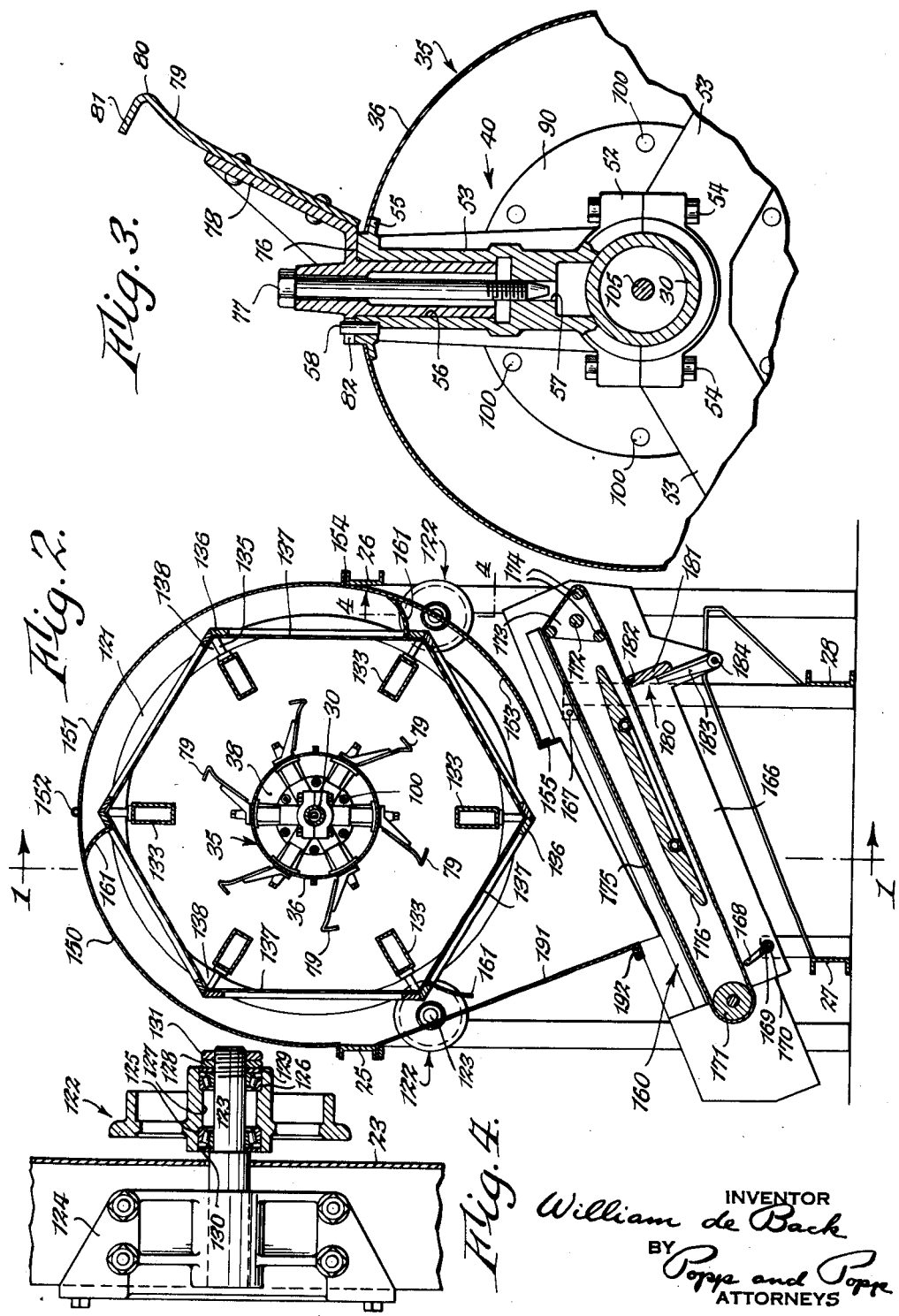
INVENTOR
William de Back
BY
Popps and Popps
ATTORNEYS Feb. 2, 1943. W. DE BACK 2,309,630
VINER
Filed July 27, 1940 4 Sheets-Sheet 3
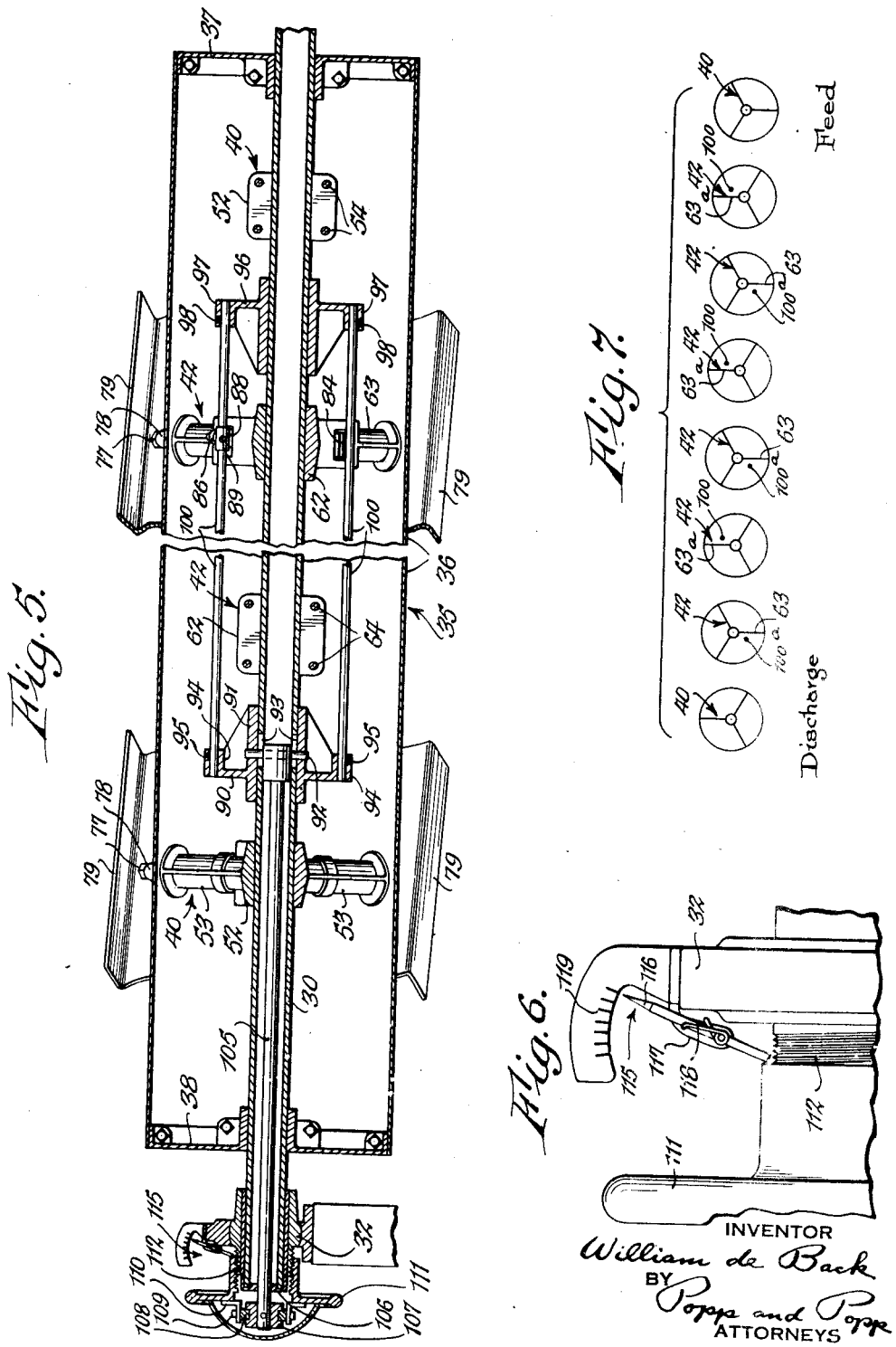

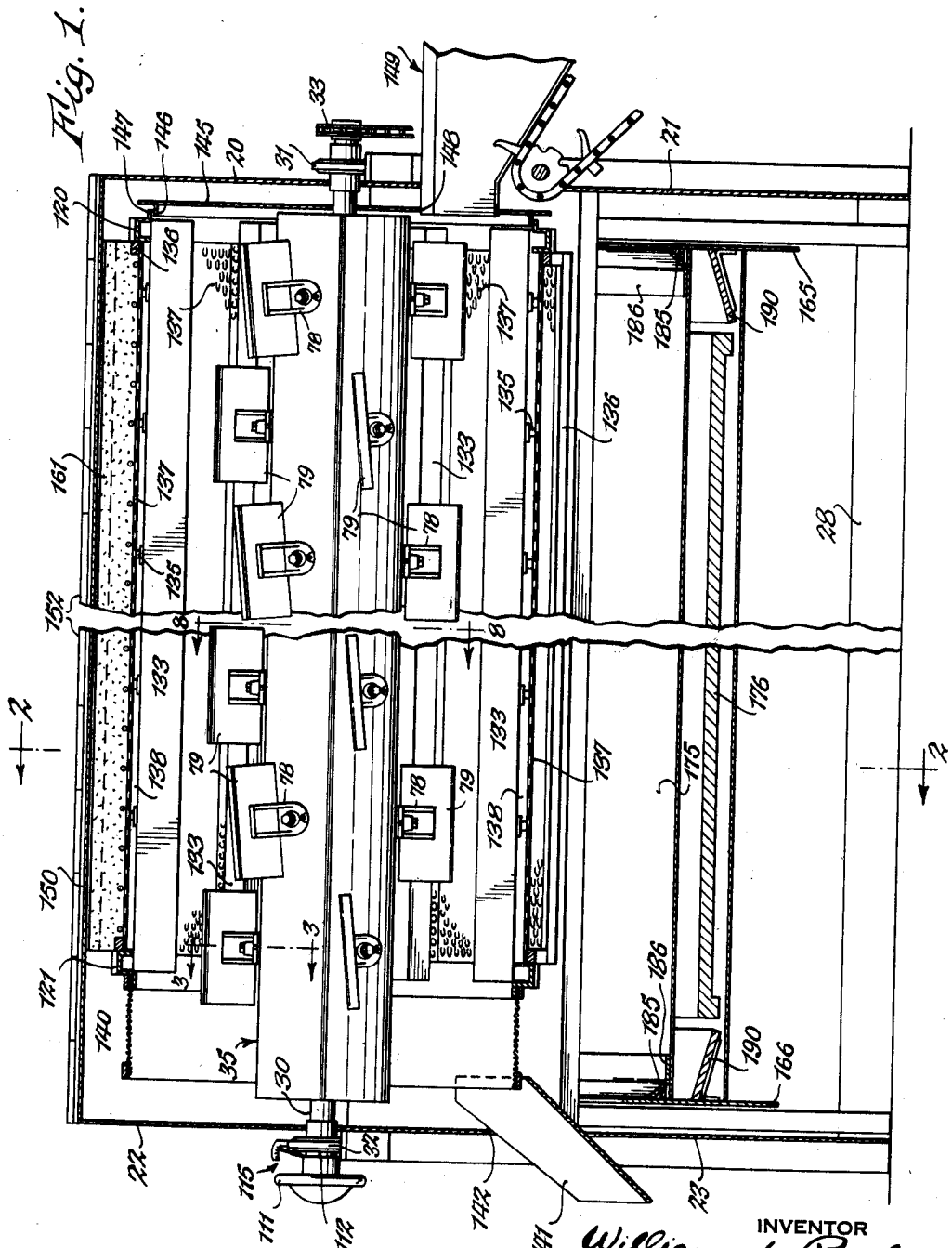

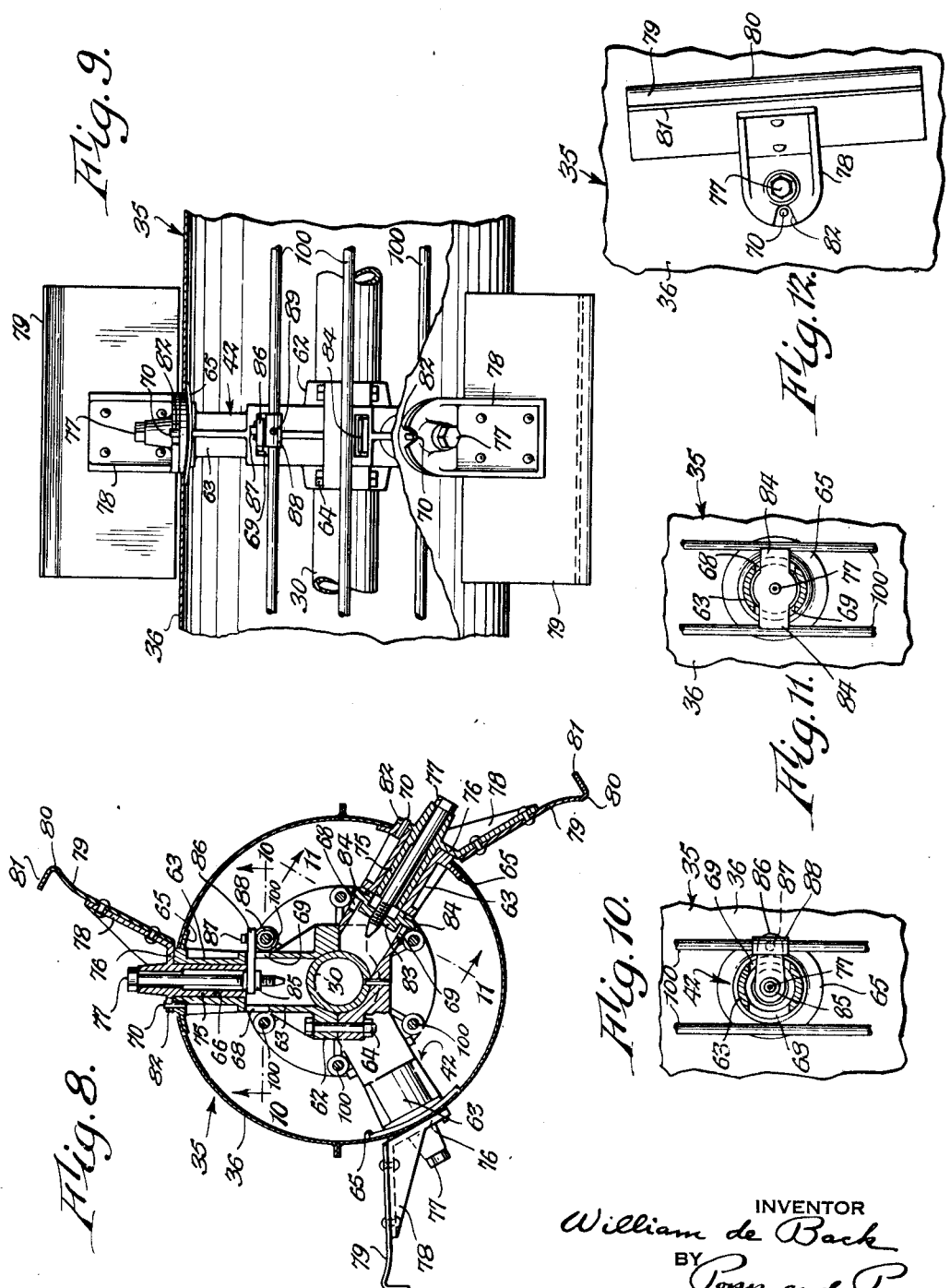

Patented Feb. 2, 1943

2,309,630

UNITED STATES PATENT OFFICE 2,309,630

VINER

William de Back, Niagara Falls, N. Y., assignor to Chisholm-Ryder Company, Incorporated, Niagara Falls, N. Y., a corporation of New York Application July 27, 1940, Serial No. 347,881

10 Claims. (Cl. 130—30)

This invention relates to viners such as are used to thresh green peas and lima beans for commercial packing. The vines having been cut in the field with a mowing machine are fed into the viner and the peas or lima beans are removed while the pods are still attached to the vines.

This application is a continuation in part of my co-pending application for viner filed November 15, 1937, Serial No. 174,605 now Patent No. 2,213,387, dated September 3, 1940.

In viners of the general class to which this invention relates the principle of impact is employed to remove the peas or lima beans from the pods, the pea pods containing more or less air as well as peas. The impact causes distortion and produces a pressure within the pod that causes it to burst at its weakest point, where the two halves are joined. In operation, the vines with their pods are dropped onto an automatic feeder which feeds them into the reel of the viner. This reel is formed by longitudinal ribs which support perforated rubber screens to form a polygonal enclosure. The screens and ribs in rotating form pockets thereby causing the reel to act as a bucket elevator lifting the vines to a position near the top. As they reach sufficient elevation they slide off of the ribs and come into contact with rapidly revolving beaters attached to a beating cylinder housed within the reel. When they are first struck some of the pods are opened and the vines acquire the speed of the beaters and are thrown against other lifting ribs where more pods are opened by impact. The beaters are adjustably set at an angle to the axis of the beater cylinder so that the vines are gradually propelled along the reel. By the time they have reached the discharge end of the reel substantially all of the pods have been opened. The separated peas or lima beans fall to the bottom of the reel as soon as they are released from the pod and pass through the perforations in the rubber screens onto means arranged below the reel which separate the peas or lima beans from the chaff and separately discharge the same.

One of the principal objects of this invention is to provide a viner in which the reel is arranged coaxially within a semi-cylindrical stationary sheet metal housing open at one side at its bottom to permit of the discharge of the threshed peas or beans and in which sweeps are mounted on the reel which sweep around in engagement with the inner wall of the semi-cylindrical housing so as to clear the housing of all peas and chaff and positively propel the same through the opening in the housing onto an inclined separating apron.

Another object of the invention is to provide a viner having a low center of gravity by extending the semi-cylindrical sheet metal housing a substantial distance under the reel of the viner and in the form of an arcuate shelf and positively ejecting the peas and chaff from this shelf onto the chaff separator by sweeps on the reel. By this means the peas and chaff are positively discharged in a restricted zone immediately adjacent the bottom of the reel; the chaff separator can be made much smaller in area; and the elevation of the reel can be reduced thereby lowering the center of gravity of the viner and providing a more compact structure.

Another aim of the invention is to provide such a viner in which the angularity of any desired group of beaters can be conveniently adjusted from the exterior of the viner and while the viner is in operation thereby enabling the operator to rapidly obtain the optimum conditions for the particular crop being handled by actual trial methods and also enabling him to conveniently reset the beaters to suit varying conditions of the vines as they are brought to the viner for threshing.

Another purpose is to provide a simple and efficient chaff separator of small size which will effectively remove the chaff from the peas or beans being threshed and can be conveniently adjusted to suit the crop being handled.

Another aim is to provide such a viner in which the reel is supported on rollers of improved form which rollers are carried by roller bearings which can readily be taken up as conditions may require.

Another object of the invention is to provide such a viner in which the reel is substantially housed by the semi-cylindrical sheet metal housing thereby avoiding the necessity of large canvas curtains such as are now usually employed to enclose the viner, the only curtain employed in the viner forming the subject of the present invention being a low curtain at one side of the viner to prevent the escape of materials falling in the restricted zone of discharge from the reel onto the chaff separator.

Another object is to provide a viner which is fabricated largely of pressed steel parts reinforced with structural steel.

Other objects are to provide such a viner which is simple and compact in construction, considering the function which it performs; which can readily be kept in a clean and sanitary condition; and which will stand up under conditions of severe and constant use without getting out of order or requiring repairs.

In the accompanying drawings:

Fig. 1 is a fragmentary, vertical, longitudinal section through the viner embodying my invention, this section being taken on line 1—1, Fig. 2.

Fig. 2 is a vertical transverse section, taken on line 2—2, Fig. 1.

Fig. 3 is a fragmentary, vertical, enlarged, transverse section, through a part of the beater cylinder, this section being taken on line 3—3, Fig. 1.

Fig. 4 is a fragmentary, vertical, longitudinal section, through one of the four rollers which support the reel, this section being taken on line 4—4, Fig. 2.

Fig. 5 is a fragmentary, enlarged, vertical, longitudinal section, through the beater cylinder arranged within the reel.

Fig. 6 is an enlarged, fragmentary view of the indicator, as shown as the left of Fig. 1, this indicator being employed to indicate the setting of the group of beaters which can be adjusted from the exterior of the machine.

Fig. 7 is a diagrammatic representation of the relation of the eight spiders within the beater cylinder and which carry the beaters, this figure illustrating the relation of the beaters constituting that group which is adjustable from the exterior of the viners to those which are set at an individually adjusted position.

Fig. 8 is a vertical, transverse section through the beater cylinder, this section being taken on line 8—8, Fig. 1.

Fig. 9 is an enlarged, fragmentary, longitudinal section through the beater cylinder and showing, in elevation, one of the beaters which is adjustable as a part of a group from the exterior of the viner.

Fig. 10 is a fragmentary, longitudinal section taken on line 10—10, Fig. 8 and showing the manner in which a beater of the group capable of being adjusted from the exterior of the machine is attached to the common adjusting mechanism for that group.

Fig. 11 is a fragmentary, longitudinal section taken on line 11—11, Fig. 8.

Fig. 12 is an enlarged, fragmentary, top plan view of one of the beaters as illustrated in Fig. 1.

The supporting frame for the viner includes an end head at the feeding end of the machine and an end head at the discharge end. The end head at the feeding end includes an upper sheet metal semi-circular plate 20 and a lower rectangular plate 21, these plates being suitably reinforced by means of structural members and similarly the end head at the discharge end of the machine includes an upper semi-circular plate 22 and a lower rectangular plate 23, both of which are suitably reinforced by structural steel. The end heads so formed are cross connected by upper longitudinal side channels 25 and 26, the flanges of which project outwardly, and by lower side channels 27 and 28.

The beater mechanism is supported and driven by a tubular shaft 30 one end of which is journaled in a bearing 31 in the end head 20, 21 at the feeding end of the viner and the other end of which is journaled in a bearing 32 in the rear end head 22, 23 of the viner. This shaft 30 is rotated by means of a sprocket 33 secured to the shaft and driven in any suitable manner (not shown).

The shaft 30 supports a concentric beater cylinder 35. This beater cylinder comprises a cylindrical sheet metal body 36 secured at one end to a circular end head 37 and at its other end to a circular end head 38, both of these end heads being secured to the tubular shaft 30. The beater cylinder shell 36 is internally reinforced intermediate the circular end heads 37 and 38 by a plurality of spiders, the arms of which also form the means for supporting the beaters.

These spiders are of two types, the two spiders, indicated generally at 40, and each arranged at the extreme end of the beater cylinder being designed to carry beaters which are individually adjustable about the axis of the spider arms and the spiders, indicated generally at 42, being designed to carry beaters, any number of which are capable of being coupled together to a common adjusting means which is actuated from the exterior of the viner to alter the setting of all the beaters so coupled as a group. This second group of spiders 42 comprise the six spiders arranged intermediate the end spiders 40 and those beaters carried by the arms of this second group of spiders 42 which are not so coupled to a common adjusting means are individually adjustable in substantially the same manner as the beaters which are carried by the end spiders 40.

Each of the two end spiders 40, as best shown in Figs. 3 and 5, comprises a hub 52 from which three tubular arms 53 radiate. To facilitate the application of these two end spiders 40 to the tubular shaft 30, the hub 52 of each spider is preferably of split form and the two parts thereof secured together in any suitable manner as by bolts 54 so as to clamp the tubular shaft 30 therebetween. At the outer end of each of the arms 53 a flange 55 is provided which supports the sheet metal shell 36 of the beater cylinder 35 and each of the arms 53 projects through an opening provided in this shell. Each of the arms is provided with a longitudinal bore 56, and at the bottom of this bore a coaxial threaded reduced bore 57 is provided to receive an attaching or tie screw as hereinafter described. At its outer end each of the arms 53 carries a pin 58, this pin being secured in the flange 55 and projecting outwardly therefrom parallel with the axis of the bore 56 and serving as a stop pin as hereinafter described.

Each of the six spiders 42 constituting the group intermediate the end spiders 40, as best shown in Figs. 5, 8 and 9, comprises a hub 62 from which three tubular arms 63 radiate. To facilitate the application of these spiders 42 to the tubular shaft 30, the hub 62 of each spider is preferably of split form and the two parts thereof secured together in any suitable manner, as by bolts 64 so as to clamp the tubular shaft therebetween. At the outer end of each of the arms 63 a flange 65 is provided which supports the sheet metal shell 36 of the beater cylinder 35 and each of the arms 63 projects through an opening provided in this shell. Each of the arms 63 is provided with a longitudinal bore 66 and at the bottom of this bore each arm is enlarged, as indicated at 67, this enlargement having slots 68 and 69 in its opposite sides, these slots extending transversely of the axis of the corresponding arm 63 and the slots being arranged in circular alinement around the several arms of each spider 42. At its outer end each of the arms 63 carries a pin 70, this pin being secured in the flange 65 and projecting outwardly therefrom parallel with the axis of the bore 66 and serving as a stop pin in the same manner as with the pins 58 carried by the arms 53 of the spiders 40.

The beaters carried by the various arms of the spiders 40 and 42 are of identical construction and hence a description of one will be deemed to apply to all of the twenty-four beaters carried by the beater cylinder 35. Each of the beaters comprises a tubular support 75, this tubular support being adapted to be fitted into the bores 56 or 66 of the arms of the spiders 40 or 42 and being provided near its outer end with an annular flange 76 which is held against the outer face of the flange 55 or 65 of the corresponding spider arm by a tie screw 77, this tie screw extending axially through the tubular support 75 and being secured at its inner end in different ways as hereinafter described. Formed integrally with the flange 76 of each tubular beater support 75 is a bracket 78 which is formed to provide a flat face disposed at an angle to the axis of the tubular support. The beaters are in the form of sheet metal plates 79 and each is secured against the flat face of a corresponding bracket 78 in any suitable manner. The outer end of each of the sheet metal beater plates 79 preferably curves forwardly to provide a leading nose 80 from which the beater plate is bent in a reverse direction to provide a reinforcing flange 81. The flange 76 of each of the tubular supports 75 is formed to provide a notch 82 in which one of the stop pins 58 or 70 is arranged, these stop pins thereby serving to limit the rotary movement of the beater supports 75 in the spider arms and hence limit the angle at which the beater plates 79 carried by these supports can be set.

When the beaters, as above described, are mounted in the arms 53 of the spiders 40 at the extreme ends of the beater cylinder, the tie screw 77 is screwed into the threaded bore 57 at the inner end of each of these arms of each spider 40. It will therefore be seen that the beaters carried by these arms can be individually adjusted to any desired angle, within the limits set by the notch 82 and the stop pin 58 and the tie screw 77 tightened to preserve this adjustment.

When the beaters, as above described, are mounted in the arms 63 of the intermediate group of spiders 42 in such manner that these beaters are capable only of individual adjustment, the inner end of the tie bolt 77 screws into a nut 83, this nut having oppositely extending arms or lugs 84 which fit into the slots 68 and 69 of the arms 63 of these spiders so as to hold the nut against turning but permit the nut to be drawn against the inner end of the reduced end portion of each of the arms 63 of these spiders 42, as best shown in Fig. 8. It will therefore be seen that the individually adjustable beaters carried by the arms 63 of the spiders 42 can each be individually adjusted to any desired angle, within the limits set by the notch 82 and the corresponding stop pin 70 and the tie screw 77 tightened to preserve this adjustment, this tightening drawing the tubular support 75 of each beater toward the nut 83 thereof and drawing this nut tightly against the opposing internal shoulders of the corresponding beater arm 63.

When the beaters, as above described, are mounted in the arms 63 of the intermediate group of spiders 42 in such manner as to be capable of adjustment as a group from the exterior of the viner, the inner end of the tie bolt 77 screws into the hub 85 of an arm 86, the hub 85 of this arm being drawn tightly against the opposing end of the tubular support 75 of the beater by the tie screw 77 so that this arm and the beater are compelled to rotate as a unit about the axis of the bore 66. The arm 86 projects outwardly through the slot 69 of the spider arm carrying this beater and is pivotally connected at its outer end to a pin 87 formed on a sleeve 88, the sleeves 88 all extending parallel with the major axis of the beater cylinder 35. Each of these sleeves 88 is provided with a set screw 89.

The master control means for simultaneously moving all of the arms 86 from the exterior of the viner to effect the adjustment of the angularity of the corresponding beater plates 79 as a group is shown as constructed as follows:

Slidingly mounted on the tubular shaft 30 within the beater cylinder 35 adjacent the discharge end of the viner and preferably between the corresponding end spider 40 and the adjacent spider 42 is a sliding head 90 of circular form and having an extended hub 91 which is slidingly fitted on the tubular shaft 30, as best shown in Fig. 5. This sliding head is actuated and is limited in its sliding movement by a drive pin 92 which extends radially through the hub 91 of the sliding head and also through a pair of longitudinal slots 93 provided in the tubular shaft 30. This sliding head is formed at its periphery to provide six equally spaced sleeves 94 provided with set screws 95. A sliding head 96 of generally similar form is slidingly mounted on the tubular shaft 30 near the feeding end of the viner, preferably between the corresponding spider 40 and the adjacent spider 42, this second sliding head, however, being unprovided with a drive pin so as to freely float on the tubular shaft 30. This second sliding head is provided with six equally spaced sleeves 97 corresponding to the sleeves 94 of the sliding head 90 and each provided with a set screw 98. The sliding heads 90 and 96 are connected by six rods 100 each secured at its opposite ends in the corresponding sleeves 94 and 97 by means of the set screws 95 and 98. These rods thereby extend in equally spaced relation lengthwise of the tubular shaft 30 and the arms 63 of the spiders 42 are so set, as best shown in Fig. 8, that the rods 100 pass the corresponding side of each arm 63 of each of these spiders 42 and hence are capable of being secured to the sleeve 88 of each beater having an arm 86 by means of the set screw 89.

On the viner as shown only two of the six rods 100 are used, the remaining four being available in the event the operator of the viner desires to add more of the beaters carried by the spiders 42 to the group of beaters capable of simultaneous adjustment from the exterior of the viner. In the viner as shown only one beater of each of the spiders 42 is shown as connected to these two rods 100 so that the group of beaters connected to the common or master adjusting mechanism comprises one beater carried by each of the spiders 42. As shown diagrammatically in Fig. 7, this group of beaters connected to the common or master adjusting mechanism comprises the beater carried by the upwardly extending arm 63 of the spider 42 nearest the feeding end of the viner, the downwardly extending arm 63 of the next succeeding spider 42 and so on in alternation to the downwardly extending arm 63 of the spider 42 nearest the discharge end of the viner.

The means for moving the six rods 100 carried by the sliding heads 90 and 96 as a unit lengthwise of the tubular shaft 30 to adjust those beaters operatively connected thereto, these comprising the beaters on the vertically extending arms of the spiders 42, as indicated in Fig. 5, comprise a longitudinally reciprocable rod 105 which is arranged within the tubular shaft 30 at the discharge end of the viner and has its inner end connected to the cross pin 92 of the sliding head 90, as best shown in Fig. 5. The outer end of this rod extends through a cap 106 at the corresponding end of the tabular shaft 30 and its outwardly projecting end is pinned to a hub 107 having a peripheral groove retaining a slip ring 108. This slip ring is connected as by pins 109 and angle pieces 110 with a hand wheel 111, the internally threaded hub of which is threaded onto the externally threaded end of the hub 112 of the adjacent bearing 32 which supports the tubular shaft 30 at the discharge end of the viner. It will be seen that this construction permits the tubular shaft 30 and rod 105 to rotate and the hand wheel 111 to remain stationary inasmuch as the connection between this hand wheel and the rod 105 is through the slip ring 108.

Upon turning the hand wheel 111 it is moved axially because of its threaded mounting on the hub 112 of the fixed bearing 32, this axial movement of this hand wheel being transmitted to the rod 105 through the slip ring 108 so as to effect an axial adjustment of the rod 109 and hence the rod assembly connected with the inner end of this rod by the cross pin 92. The position of this rod assembly is preferably indicated by an indicator 115, as best shown in Fig. 6, this indicator being shown as comprising a pointer 116 pivotally secured to a bracket 117 to swing about a horizontal axis extending transversely of the viner, this bracket being suitably secured to the stationary bearing 32 and the lower end of this pointer 116 being held against the inner end of the hub of the hand wheel 111 by a spring 118 which is anchored at one end in the bracket 117 and at its other end is suitably secured to the pointer 116. The other end of this pointer traverses a scale 119 suitably provided on the bracket 117, this scale being suitably calibrated to indicate the different positions of the adjustable beaters.

As previously briefly explained, the beater cylinder 35 revolves within a reel. This reel includes a pair of circular end rings 120, 121 which are in the form of steel channels, the flanges thereof extending inwardly and the outer faces thereof forming tracks which ride upon flanged supporting rollers 122. Each of these rings is supported on two of such flanged rollers 122 and as best shown in Fig. 4, each of the rollers is rotatably mounted on a stub shaft 123 projecting inwardly from a supporting bracket 124 parallel with the axes of the rings 120, 121, the brackets being mounted on the main end heads of the viner in any suitable manner. The inner end of each of the stub shafts 123 is of reduced diameter and carries a pair of spaced taper roller bearings 125 and 126, the outer races of which are held in fixed spaced relation by an inwardly projecting shoulder 127 of the hub of the flanged roller 122. The axes of the rollers of these roller bearings converge toward the center of the reduced end of the stub shaft 123 and the inner race of the bearing 126 at the outboard end of the stub shaft 123 is held in position by an adjusting nut 128 threaded on the end of the stub shaft 123, a washer 129 being shown as interposed between this nut and the inner race of the bearing 126. The inner race of the other bearing 125 is held against a washer 130, this washer being backed by the shoulder formed on the stub shaft 123 by the provision of the reduced end thereon. With this arrangement it will be seen that the bearings 125 and 126 can readily be taken up to compensate for wear. Thus by adjusting the nut 128 inwardly, the inner race of the bearing 126 is moved axially to take up wear in this bearing and this adjustment also moves the flanged roller 122 axially to take up any wear in the other bearing by the axial adjustment of its outer race relative to its inner race. This adjustment is maintained by a lock nut 131 which engages the adjusting nut 128 to hold it against turning after such adjustment has been effected.

The end rings 120, 121 of the reel are shown as connected by six lifting ribs 133. Each of these lifting ribs is preferably made of sheet metal and of closed box form and the ends of these lifting ribs are suitably connected to the inner side of the end rings 120, 121 as shown, for example, in my said copending application Ser. No. 174,605, of which this application is a continuation in part. It will be noted that the lifting ribs are located inside of these end rings 120, 121 and that the ends of the lifting ribs at the inlet end of the reel extend to the end face of the ring 120. By this arrangement it has been found that the lifting ribs draw the material into the reel and hence facilitate the movement of the vines into and through the reel.

At spaced intervals along the outer face of each lifting rib 120, spacer posts 135 are welded. The frames 136 of the rubber screens 137 which enclose the reel are secured in any suitable manner to the outer ends of these spacer posts so as to provide a space 138 between the screen frames and the supporting ribs, which space permits the peas or lima beans to escape from the buckets formed by the lifting ribs and screens as the reel rotates. Any suitable means (not shown) can be provided for rotating the reel in the same direction as the beater cylinder 35, but at a slower speed.

At the outlet end of the reel a cylindrical salvage screen 140 is suitably attached to the end ring 121 of the reel, this salvage screen extending axially beyond the reel. The purpose of the salvage screen 140 is to permit the straw to be separated and any entrained peas to fall therefrom. Such entrained peas falling from the straw in the salvage screen 140 fall through the screen.

The straw from the salvage screen passes through an outlet chute 141 the upper end of which is located under the discharge end of the salvage screen, this chute conducting the straw through an outlet opening 142 in the end head section 23 of the viner frame, as shown in Fig. 1, and discharging the straw onto the usual straw carrier (not shown), this straw carrier being of any usual and well known construction and operating to stack the straw at a distance from the viner.

At the inlet end of the reel a stationary plate 145 is suitably mounted on the corresponding end head of the viner frame, this plate enclosing the inlet end of the reel. To prevent the escape of chaff this plate is provided on its inner side with a circular flange 146 which is located within a circular flange 147 welded to the end face of the end ring 120, as shown in Fig. 1. The plate 145 is provided with an opening 148 which is arranged to discharge into the bottom of the reel and is in line with the rotating lifting ribs 133.

The vines from the field are loaded on a feeder, indicated generally at 149 which can be of any usual construction and this feeder discharges the vines toward the opening 148 where the vines are picked up by the coaction of the lifting ribs 133 and the beater plates 79 at the inlet end of the viner and drawn into the reel. It has been found that the extension of the lifting ribs 133 to the end face of the ring 120 materially facilitates the transfer of the vines from the feeder 149 to the reel as compared with former viners where the lifting ribs extended between the end rings but not inside of the same.

Instead of the usual canvas curtains generally employed for enclosing the viner, the top of the reel is shown as enclosed by a pair of sheet metal hood plates 150, 151 which extend between the end heads of the viner frame and jointly form a semi-cylindrical hood or housing for the upper part of the reel. To permit of ready access to the reel, the plates 150 and 151 are preferably hinged to each other at their apex, as indicated at 152, and the lower flanged edges of these plates are shown as resting upon the upper flanges of the side channels 25 and 26, respectively, of the viner frame. The semi-cylindrical hood formed by the plates 150 and 151 is continued below the reel at one side in the form of an arcuate shelf 153, the sheet metal plate forming this shelf 153 extending between the main end heads of the viner frame. The plate forming this arcuate shelf 153 is shown as flanged along its upper edge, as indicated at 154, to rest on the upper flange of the frame channel 26 under the lower flange of the hinged plate 151 and also as flanged along its lower edge, as indicated at 155, to provide a reinforced lower discharge edge for the shelf and over which the peas or lima beans, together with any chaff falling through the reel are discharged onto the chaff separator arranged thereunder and indicated generally at 160.

The hood plates 150 and 151 and the arcuate shelf 153 forming a continuation of the hood plate 151 are arranged concentric with the axis of the reel and to positively eject all of the separated peas or beans and the chaff from this hood and arcuate shelf, the reel is provided with sweeps 161 which sweep around the interior faces of the plates 150, 151 and shelf 153. The reel is shown as having three such sweeps each composed of a strip of rubber extending the full length of the reel and being secured to one side of alternate frames 136 of the rubber screen near each alternate apex of the hexagonal reel. With these sweeps it will be noted that the entire inner surface of the hood plates 150, 151 are continuously swept free of peas and chaff so as to avoid any lodging of materials therein. At the same time by positively sweeping these materials off of the arcuate shelf 153, the discharge of the peas and chaff from the reel is concentrated in a restricted zone and at the same time the shelf need not be arranged at a steep angle to be self-cleaning, which steep angle would necessitate raising the reel and the center of gravity of the viner. By the use of the sweeps 161 it is also unnecessary to mechanically agitate the relatively flat shelf 153 as with the baffles described in my said application Serial No. 174,605 of which this is a continuation in part.

The chaff separator 160 onto which the peas or beans and chaff threshed from the vines in the reel are swept by the sweeps 161 is generally in the form of an inclined apron which travels around rollers arranged parallel with the axis of the reel, the upper flight of the apron being vibrated or jarred to insure the heavy peas or beans rolling to the bottom in opposition to the direction of movement of this upper flight and the chaff being carried over the top of the apron and being discharged at one side of the viner. To this end the chaff separator 160 includes vertical end plates 165, 166 which are suitably cross braced to provide a rigid frame and these end plates being pivotally secured to the end heads of the viner frame, as indicated at 167 so that the frame is capable of being set at different inclinations. To hold the frame at the desired inclination, each of the end plates 165, 166 is provided at its lower end with an arcuate slot 168, the slots being concentric with the axis of the pins 167 which support the frame and receiving studs 169 which project inwardly from the end heads of the viner frame, these studs being provided with nuts 170 for securing the studs at any desired position along the arcuate slots 168 thereby to hold the plates at any desired inclination.

The frame formed by the connected end plates 165, 166 carries a lower round horizontal roller 171 which is suitably journaled at its opposite ends in the end plates 165, 166 and an upper horizontal drive shaft 172 which is also journaled at its opposite ends in the plates 165, 166 and is driven by any suitable means (not shown) to rotate clockwise as viewed in Fig. 2. At its opposite ends this drive shaft 172 carries triangular plates or heads 173 the corresponding apexes of which are connected by horizontal rods 174, these three rods thereby forming, in effect, a triangular roller. The endless separating apron 175 of the chaff separator passes around the lower cylindrical roller 171 and around the three rods 174 of the upper triangular roller and since this upper triangular roller is driven in a clockwise direction, as viewed in Fig. 2, the upper stretch of the apron travels upwardly so as to carry the chaff over the upper triangular roller, the peas or beans rolling down the apron and being discharged over the lower round roller 171 into a suitable receptacle or conveyer (not shown).

The triangular form of the upper roller formed by the three rods 174 thereof, serves to slap the upper stretch of the apron 175 up and down so as to accelerate the downward movement of the peas or beans. This effect is accentuated by the provision of a board or table 176 between the two stretches of the apron 175 and against the upper and lower faces of which the upper and lower stretches of the apron 175 are slapped by the triangular upper roller, the slapping of the upper stretch of this apron against the board 176 serving to accelerate the downward movement of the peas or beans and the slapping of the lower stretch of the apron against this board 176 serving to dislodge any chaff tending to adhere thereto.

This chaff adhering to the lower stretch of the apron 175 is also dislodged by a scraper indicated at 180. This scraper is shown as comprising a horizontal board 181 extending between the end plates 165, 166 of the shaft separator frame immediately below the lower stretch of the chaff separating apron 175 and carrying a scraping knife 182 which is adapted to engage the underside of the lower stretch of the apron, as best shown in Fig. 2. This scraper board is shown as carried by arms 183 extending upwardly from a cross rod 184 between the two end plates 165 and 166 of the chaff separator frame.

The opposite edges of the separating apron 175 closely follow the inner faces of the two end plates 165 and 166 and to prevent the chaff or peas from falling between these edges and the end plates, supporting bars 185 which are triangular in cross section are secured to the inner faces of the side plates 165 and 166 in a position generally parallel with the upper stretch of the separating apron 175 and strips 186 of flexible material are secured to these triangular bars 185, the free sides of these flexible strips resting on the upper stretch of the separating apron, as best illustrated in Fig. 1. The flexibility of these strips 186 permits the upper stretch of the separating apron 175 to be slapped up and down without breaking contact with these strips.

To prevent the opposite edges of the upper stretch of the separating apron from sagging unduly, plates 190 are suitably secured to the inner faces of the side plates 165, 166 between the upper and lower stretches of the separating apron 175, these plates 190 extending generally parallel with the upper stretch of this apron and also including downwardly from the side plates toward the center of the viner so that if the upper stretch of the separating apron 175 sags at its edges beyond a predetermined amount, these edges will be supported by the inclined plates 190 and hence the apron formed with upturned edges to prevent chaff or peas from escaping thereover and falling between the two stretches of the apron.

To prevent the escape of peas or beans in bouncing off the upper stretch of the separating apron 175 or thrown by the reel or its sweeps 161, a small canvas curtain 191 is secured along its upper edge to the channel 25 and at its lower end to a cross bar 192 suitably secured to the side plate 165, 166 of the chaff separator.

*Operation*

The harvested vines with the pods attached are brought to the viner and are fed to the feeder 149, the endless conveyer of which delivers the vines continuously to the inlet opening 148 in the stationary plate 145. In operation the reel is rotated in a clockwise direction, as viewed in Fig. 2, and the beater cylinder 35 is likewise rotating in a clockwise direction, but at a greater speed. The beater cylinder 35 is rotated through power applied to the sprocket 33 which turns the tubular shaft on which the beater cylinder 35 and its spiders 40 and 42 are mounted. The beater plates 79 carried by the arms of these spiders are all set at a pitch which conveys the vines lengthwise of the reel to the discharge end thereof.

This adjustment of the beaters carried by the arms of the spiders 40 at the extremities of the beater cylinder is effected by loosening the tie screws 77 holding these beaters and turning the beaters about the axes of these tie screws to provide the desired pitch after which the tie screws can be tightened to hold the beaters at the desired adjustment. A similar adjustment is effected of those beaters 79 carried by the arms of the six intermediate spiders 42 where these beaters are not interconnected by the rods 100. With these beaters the loosening of the tie screws 77 loosens the nuts 83 at the inner ends of the spider arms so as to permit the tubular supports 75 for the beaters to be turned in setting the beater plates 79 at any desired angle. When so set the tie screws 77 are tightened to draw the nuts 83 against the opposing parts of the arms of the spiders 42 to hold the beater plates 79 in this set position.

While the viner is in operation the operator can adjust the interconnected beater plates 79 to any desired angularity to suit the particular crop being harvested. To do this the operator turns the stationary hand wheel 111, this moving the hand wheel lengthwise by reason of its threaded mounting on the stationary hub 112 of the bearing 32. This axial movement of the hand wheel, besides moving the indicator needle 116 to indicate the setting of the interconnected beaters on the scale 119 also shifts the slip ring 103 to shift the rod 105 axially in a corresponding direction. This axial movement of this rod 105, through the cross pin 92, effects a corresponding movement of the two sliding heads 90 and 95 which are interconnected by the six rods 100. Such axial movement of the rods 100 effects a rotation of the small arms 86 which are connected to these rods and as these arms are secured to the tie bolts 77 and the tubular supports 75 of the corresponding beaters, this rotation of these arms effects a corresponding movement of these beaters to a greater or less angularity to suit the conditions encountered. In the viner as illustrated only those beater plates 79 carried by the upwardly and downwardly extending arms 63, indicated at *a* in Fig. 7, of the spiders 42 are so connected with the rods 100 and hence only these six beaters are so moved in unison by the adjustment of the hand wheel 11. However, it will be understood that any number of the beaters carried by the arms of the spiders 42 can be connected to the rods 100 so as to be so adjusted as a group to have a greater or less angularity.

The vines fed to the inlet opening 148 are caught by the adjacent ends of the lifting ribs 133 and the series of beater plates 79 carried by the first spider 40. As the reel rotates the lifting ribs 133 form pockets which allow the reel to act as a bucket elevator, lifting the vines to a position near the top of the reel. As they reach a sufficient elevation the vines slide out of the buckets and come into contact with the rapidly revolving beater plates 79. This opens some of the pods and having acquired the speed of the beaters the vines are then thrown against other lifting ribs 133 where more pods are opened by impact. The separated peas are caught by the reel and since the reel is enclosed by the rubber screens 137, these peas fall through the perforations of these screens. It will be noted that the lifting ribs 133 are spaced from the reel screen frames by the spacing posts 135 and therefore any peas which are thrown against the top of the reel are not returned to the zone of action of the beaters by the lifting ribs 133 but roll down between the lifting ribs 133 and the screen frames until they fall through the perforations of the rubber screens 137.

Because of the pitch or angle of the beater plates 79 the vines are moved toward the discharge end of the reel each time the beating cycle is repeated. The threshed vines are then delivered by the last series of beaters carried by the spider 49 at the discharge end of the viner into the salvage screen 149. Since the endmost series of beaters extend only partly into the salvage screen 140 the vines are permitted to spread out and any peas entrained in the vines are permitted to fall through the vines and through the metal screening of the salvage screen. The threshed vines, or straw, fall from the open end of the salvage screen 140 into the broad discharge chute 141 from which they fall onto the usual straw carrier (not shown) which stacks the threshed vines. The peas and chaff falling from the rubber aprons 137 of the reel or falling from the salvage screen 140 either fall directly onto the upper stretch of the separating apron 175 or fall onto the arcuate shelf 153 under one side of the reel. The peas and chaff falling onto the arcuate shelf 153 are immediately and positively ejected from this shelf onto the upper stretch of the chaff separating apron 175 by the rubber sweeps 161 which are attached to the reel and which sweep over the concentric face of this shelf 153. Similarly, any chaff thrown against the interior faces of either of the plates 150 or 151 forming the semicylindrical hood for the reel are swept therefrom by the rubber sweeps 161 and discharged from the arcuate shelf 153 onto the upper stretch of the chaff separating apron 175. The peas so discharged onto the upper stretch of the chaff separating apron roll down this apron by reason of the angular disposition of this upper stretch of the chaff separating apron. This movement of the peas down the apron is accelerated by the beating action imparted to this apron by the triangular form of the bars 174 which form, together with the triangular end heads 173 and drive shaft 172, the upper roll for this apron. This triangular form of the upper roll serves to slap the upper stretch of this apron against the board or table 176 so that the peas are rapidly caused to roll down this upper stretch and over the lower roller 171 into a suitable receptacle or conveyer (not shown). The chaff clings to the upper stretch of the chaff separating apron 175 and is carried over the upper triangular drive roll where it is discharged. Any chaff clinging to the lower stretch of the chaff separating apron is scraped therefrom by the blade 182 of the scraper board 180. The dislodgement of the chaff from this lower stretch of the chaff separating apron is further facilitated by the slapping of this lower stretch of the chaff separating apron 175 against the underside of the stationary board or table 176.

Chaff is prevented from working around the edges of the chaff separating apron 175 which traverse the opposing faces of the end plates 165, 166 by the flexible strips 186 which are secured to these side plates and rest upon the opposite edges of the chaff separating apron so as to prevent the escape of chaff around the edges of the apron. Such escape is further prevented by the provision of the inclined boards 190 between the two stretches of the chaff separating apron 175 which turns the opposite edges of the chaff separating apron upwardly in the event that the upper stretch of this chaff separating apron sags low enough to contact these boards 190.

In the event that a greater inclination of the chaff separating apron 175 is desired as, for example, when handling lima beans, the operator can loosen the nuts 170 and swing the side plates downwardly, the studs 169 moving upwardly in the arcuate slots 168, these arcuate slots being concentric with the pivots 167 supporting the upper end of the side plates 165 and 166. When the desired angularity is obtained the operator can tighten the nuts 170 so as to retain the chaff separating apron at this angle.

From the foregoing it will be seen that the present invention provides a viner which is compact in construction and in particular can be constructed with a low center of gravity by virtue of the sweeps carried by the reel and serving to sweep the interior of the semicylindrical hood and the arcuate shelf forming a continuation thereof and thereby positively discharge the peas or beans and chaff in a restricted zone immediately above the chaff separator which can thereby be made of smaller area than as heretofore constructed. It will further be seen that any number of the beaters on the beater cylinder can be interconnected in any desired grouping so as to be adjustable as to angularity while the viner is in operation by simply turning the hand wheel 111. This permits of the operator adjusting the operation of the viner by trial methods to suit the particular crop being handled and also enables him to rapidly readapt the viner to changing conditions as the loads of vines are brought to the viner. It will further be seen that the present invention provides a simplified form of rollers for supporting the reel at its opposite ends and also provides an extremely simple and efficient chaff separator for the materials threshed from the vines on passing through the reel.

I claim as my invention:

1. A viner, comprising a frame, a reel mounted on said frame to rotate about a horizontal axis and adapted to receive and convey the vines and pods attached thereto, means for rotating said reel, means for threshing the vines conveyed by said reel, a plate arranged adjacent said reel and concentric with the axis thereof, and a sweep carried by said reel and sweeping said plate to remove any threshed materials therefrom.

2. A viner, comprising a frame, a reel mounted on said frame to rotate about a horizontal axis and adapted to receive and convey the vines and pods attached thereto, means for rotating said reel, an arcuate shelf arranged under said reel to one side thereof and curved concentric with the axis of said reel, and a sweep carried by said reel and sweeping said shelf to remove any threshed materials therefrom.

3. A viner, comprising a frame, a reel mounted on said frame to rotate about a horizontal axis and adapted to receive and convey the vines and pods attached thereto, means for rotating said reel, means for threshing the vines conveyed by said reel, a semicylindrical sheet metal housing mounted on said frame and extending around the upper part of said reel concentric with the axis thereof, and a sweep carried by said reel and sweeping the internal face of said housing to remove any threshed materials therefrom.

4. A viner, comprising a frame, a reel mounted on said frame to rotate about a horizontal axis and adapted to receive and convey the vines and pods attached thereto, means for rotating said reel, means for threshing the vines conveyed by said reel, a semicylindrical sheet metal housing mounted on said frame and extending around the upper part of said reel concentric with the axis thereof, and a sweep carried by said reel and sweeping the internal face of said housing to remove any threshed materials therefrom, said housing being composed of two arcuate plates hinged at their upper longitudinal edges to permit of ready access to said reel.

5. A viner, comprising a frame, a reel mounted on said frame to rotate about a horizontal axis and adapted to receive and convey the vines and pods attached thereto, means for rotating said reel, means for threshing the vines conveyed by said reel, a semicylindrical sheet metal housing mounted on said frame and extending around the upper part of said reel concentric with the axis thereof, and an arcuate shelf arranged under said reel to one side thereof and curved concentric with the axis of said reel, said arcuate shelf forming a continuation of one side of said semicylindrical housing, a sweep carried by said reel and sweeping the internal face of said housing and said shelf to remove any threshed materials therefrom.

6. A viner, comprising a frame, a screened reel rotatably mounted on said frame and having an inlet end adapted to receive vines with attached pods and having an outlet end through which straw is discharged, a shaft extending coaxially through said reel, means for driving said reel and shaft and a beater assembly mounted on said shaft within said reel and acting to thresh and convey the vines therethrough, said beater assembly comprising a plurality of spiders mounted on said shaft, the radially extending arms of which are of tubular form, a cylindrical shell supported by said arms adjacent the outer ends thereof, a plurality of beaters, each of said beaters including a supporting stem rotatably mounted in the corresponding tubular arm of one of said spiders, an arm secured to certain of said stems within said beater cylinder, an axially movable structure slidably mounted on said shaft and rotatable therewith, pivots connecting said axially movable structure with said arms to rotate said certain beater stems in unison upon moving said axially movable structure axially relative to said beater cylinder and means mounted on said frame exteriorly of said beater cylinder and reel and operatively connected with said axially movable structure to adjust said certain beater stems while said beater cylinder and reel are rotating.

7. A viner, comprising a frame, a screened reel rotatably mounted on said frame and having an inlet end adapted to receive vines with attached pods and having an outlet end through which straw is discharged, a shaft extending coaxially through said reel, means for driving said reel and shaft and a beater assembly mounted on said shaft within said reel and acting to thresh and convey the vines therethrough, said beater assembly comprising a plurality of spiders mounted on said shaft, the radially extending arms of which are of tubular form, a cylindrical shell supported by said arms adjacent the outer ends thereof, a plurality of beaters, each of said beaters including a supporting stem rotatably mounted in the corresponding tubular arm of one of said spiders, an arm secured to certain of said stems within said beater cylinder, a pair of spaced end heads slidingly mounted on said shaft within said beater cylinder and rotatable therewith, rods connecting said end heads, pivots connecting said rods with said arms to rotate said certain beater stems in unison upon moving said end heads axially on said shaft, and means mounted on said frame exteriorly of said beater cylinder and reel and operatively connected with one of said end heads to adjust said certain beater stems while said beater cylinder and reel are rotating.

8. A viner, comprising a frame, a screened reel rotatably mounted on said frame and having an inlet end adapted to receive vines with attached pods and having an outlet end through which straw is discharged, a tubular shaft extending coaxially through said reel, means for driving said reel and shaft and a beater assembly mounted on said shaft within said reel and acting to thresh and convey the vines therethrough, said beater assembly comprising a plurality of spiders mounted on said shaft, the radially extending arms of which are of tubular form, a cylindrical shell supported by said arms adjacent the outer ends thereof, a plurality of beaters, each of said beaters including a supporting stem rotatably mounted in the corresponding tubular arm of one of said spiders, an arm secured to certain of said stems within said beater cylinder, a pair of spaced end heads slidingly mounted on said shaft within said beater cylinder and rotatable therewith, rods connecting said end heads, pivots connecting said rods with said arms to rotate said certain beater stems in unison upon moving said end heads axially on said shaft, a shifting rod arranged in said tubular shaft, a pin extending laterally through said shifting rod, shaft and one of said heads and compelling said head and shifting rod to move axially in unison, and means mounted on said frame exteriorly of said beater cylinder and reel and operatively connected with said shifting rod to adjust said certain beater stems while said beater cylinder and reel are rotating.

9. A viner, comprising a frame, a screened reel rotatably mounted on said frame and having an inlet end adapted to receive vines with attached pods and having an outlet end through which straw is discharged, a tubular shaft extending coaxially through said reel, bearings on said frame and supporting the opposite ends of said tubular shaft, means for driving said reel and shaft and a beater assembly mounted on said shaft within said reel and acting to thresh and convey the vines therethrough, said beater assembly comprising a plurality of spiders mounted on said shaft, the radially extending arms of which are of tubular form, a cylindrical shell supported by said arms adjacent the outer ends thereof, a plurality of beaters, each of said beaters including a supporting stem rotatably mounted in the corresponding tubular arm of one of said spiders, an arm secured to certain of said stems within said beater cylinder, a pair of spaced end heads slidingly mounted on said shaft within said beater cylinder and rotatable therewith, rods connecting said end heads, pivots connecting said rods with said arms to rotate said certain beater stems in unison upon moving said end heads axially on said shaft, a shifting rod arranged in said tubular shaft, a pin extending laterally through said shifting rod, shaft and one of said heads and compelling said head and shifting rod to move axially in unison, and means mounted on said frame exteriorly of said beater cylinder and reel and operatively connected with said shifting rod to adjust said certain beater stems while said beater cylinder and reel are rotating, comprising a slip ring rotatably mounted on an end of said shifting rod projecting outwardly from one end of said tubular shaft adjacent one of said bearings, said ring being compelled to move axially with said shaft, a hand wheel threadedly mounted on said one of said bearings and moving axially when turned and means operatively connecting said hand wheel with said slip ring.

10. A viner, comprising a frame, a screened reel rotatably mounted on said frame and having an inlet end adapted to receive vines with attached pods and having an outlet end through which straw is discharged, a tubular shaft extending coaxially through said reel, bearings on said frame and supporting the opposite ends of said tubular shaft, means for driving said reel and shaft and a beater assembly mounted on said shaft within said reel and acting to thresh and convey the vines therethrough, said beater assembly comprising a plurality of spiders mounted on said shaft, the radially extending arms of which are of tubular form, a cylindrical shell supported by said arms adjacent the outer ends thereof, a plurality of beaters, each of said beaters including a supporting stem rotatably mounted in the corresponding tubular arm of one of said spiders, an arm secured to certain of said stems within said beater cylinder, a pair of spaced end heads slidingly mounted on said shaft within said beater cylinder and rotatable therewith, rods connecting said end heads, pivots connecting said rods with said arms to rotate said certain beater stems in unison upon moving said end heads axially on said shaft, a shifting rod arranged in said tubular shaft, a pin extending laterally through said shifting rod, shaft and one of said heads and compelling said head and shifting rod to move axially in unison, and means mounted on said frame exteriorly of said beater cylinder and reel and operatively connected with said shifting rod to adjust said certain beater stems while said beater cylinder and reel are rotating, comprising a slip ring rotatably mounted on an end of said shifting rod projecting outwardly from one end of said tubular shaft adjacent one of said bearings, said ring being compelled to move axially with said shaft, a hand wheel threadedly mounted on said one of said bearings and moving axially when turned, means operatively connecting said hand wheel with said slip ring, an indicator mounted on said one of said bearings and means operatively connecting said hand wheel and indicator to indicate the setting of said certain stems of said beaters.

WILLIAM DE BACK.